(12) United States Patent
Maruyama et al.

(10) Patent No.: US 12,246,787 B2
(45) Date of Patent: Mar. 11, 2025

(54) SUPPORT STRUCTURE FOR VEHICLE

(71) Applicants: HITACHI ASTEMO, LTD., Ibaraki (JP); SUBARU CORPORATION, Tokyo (JP); TOYOTA JIDOSHA KABUSHIKI KAISHA, Aichi (JP)

(72) Inventors: Yasuhiro Maruyama, Nagano (JP); Susumu Yodono, Nagano (JP); Yasuaki Matsumoto, Tokyo (JP)

(73) Assignees: HITACHI ASTEMO, LTD., Ibaraki (JP); SUBURU CORPORATION, Tokyo (JP); TOYOTO JIDOSHA KABUSHIKI KAISHA, Aichi (JP)

( * ) Notice: Subject to any disclaimer, the term of this patent is extended or adjusted under 35 U.S.C. 154(b) by 430 days.

(21) Appl. No.: 17/797,582

(22) PCT Filed: Dec. 21, 2020

(86) PCT No.: PCT/JP2020/047586
§ 371 (c)(1),
(2) Date: Aug. 4, 2022

(87) PCT Pub. No.: WO2021/181814
PCT Pub. Date: Sep. 16, 2021

(65) Prior Publication Data
US 2023/0150574 A1    May 18, 2023

(30) Foreign Application Priority Data
Mar. 10, 2020   (JP) ................................ 2020-041147

(51) Int. Cl.
*B62D 7/18*   (2006.01)
*B60G 3/06*   (2006.01)
*B60G 13/00*  (2006.01)

(52) U.S. Cl.
CPC ................ *B62D 7/18* (2013.01); *B60G 3/06* (2013.01); *B60G 13/005* (2013.01); *B60G 2200/142* (2013.01); *B60G 2206/50* (2013.01)

(58) Field of Classification Search
CPC ............................. B62D 7/18; B60G 2206/50
See application file for complete search history.

(56) References Cited

FOREIGN PATENT DOCUMENTS

| CN | 215205057 U | * | 12/2021 |
| CN | 114802438 A | * | 7/2022 |

(Continued)

OTHER PUBLICATIONS

International Search Report issued Mar. 9, 2021 in International Application No. PCT/JP2020/047586.

*Primary Examiner* — Nicole T Verley
(74) *Attorney, Agent, or Firm* — Wenderoth, Lind & Ponack, L.L.P.

(57) ABSTRACT

A support structure for a vehicle includes: a body portion (22); a damper attachment portion (24); a tie-rod attachment portion (26); and a lower arm attachment portion (28). The vehicle supporting structure (20) has a first rib (32) that connects the damper attachment portion (24) with the tie-rod attachment portion (26), a second rib (34) that connects the tie-rod attachment portion (26) and the lower arm attachment portion (28), and a third rib (36) that connects the first rib with the second rib. The first rib is inclined to have a height that gradually decreases from the damper attachment portion toward the tie-rod attachment portion, forming a first inclined portion (32*a*) and a first thinned portion (32*b*). The third rib is inclined to have a height that gradually decreases from the second rib toward the first rib, forming a second inclined portion (36*a*) and a second thinned portion (36*b*).

4 Claims, 3 Drawing Sheets

(56) References Cited

FOREIGN PATENT DOCUMENTS

| | | | | |
|---|---|---|---|---|
| CN | 216886892 U | * | 7/2022 | |
| DE | 26 24 704 | | 12/1977 | |
| DE | 101 58 102 | | 6/2003 | |
| DE | 102 12 873 | | 10/2003 | |
| DE | 10 2010 023 232 | | 8/2011 | |
| DE | 10212873 B4 | * | 11/2011 | ........... B60G 13/006 |
| DE | 10 2011 016 628 | | 10/2012 | |
| DE | 10 2012 024 654 | | 7/2014 | |
| DE | 102014205384 A1 | * | 9/2015 | ........... B60G 15/068 |
| DE | 102017102102 A1 | * | 8/2017 | |
| DE | 102019208444 A1 | * | 12/2020 | |
| DE | 102013217219 B4 | * | 5/2021 | ........... B60G 13/008 |
| EP | 1 512 610 | | 3/2005 | |
| FR | 3091848 A1 | * | 7/2020 | |
| JP | 2007-22250 | | 2/2007 | |
| JP | 2014-91468 | | 5/2014 | |
| JP | 2014-91469 | | 5/2014 | |
| JP | 2015-54554 | | 3/2015 | |
| JP | 6116191 B2 | * | 4/2017 | |
| JP | 2018-2103 | | 1/2018 | |
| JP | 2018002103 A | * | 1/2018 | |
| JP | 6408518 B2 | * | 10/2018 | |
| JP | 6944421 B2 | * | 10/2021 | |
| WO | WO-2012139701 A1 | * | 10/2012 | ........... B60G 13/006 |
| WO | WO-2014073353 A1 | * | 5/2014 | ........... B60G 15/062 |
| WO | 2016/134699 | | 9/2016 | |

* cited by examiner

SUPPORT STRUCTURE FOR VEHICLE

TECHNICAL FIELD

The present invention relates to a support structure for vehicle having a structure that induces fracture when an inadvertent external force is applied to a vehicle.

BACKGROUND ART

As shown in PTL 1 (JP-A-2014-91469), in order to maintain high rigidity in a support structure for vehicle (steering knuckle), strength is ensured by forming a first rib connecting a damper attachment portion and a tie-rod attachment portion, a second rib connecting a tie-rod attachment portion and a lower arm attachment portion, and a third rib for reinforcing these ribs.

The first rib, the second rib, and the third rib have a required width and height, and these ribs have a triangular shape in a front view, thereby increasing the strength of a support structure 20 for vehicle.

CITATION LIST

Patent Literature

PTL 1: JP-A-2014-91469

SUMMARY OF INVENTION

Technical Problem

Incidentally, in a support structure for vehicle such as a steering knuckle, for example, when an inadvertent external force is applied to a front side and an obliquely front side of the vehicle, a force in a front side direction or an obliquely front direction acts on the steering knuckle together with the wheel, the tie-rod attachment portion facing the rear of the vehicle faces a vehicle interior direction, and a member connected to the tie-rod attachment portion may enter a vehicle interior.

Solution to Problem

The present embodiment has been made to solve the above problem, and an object of the present embodiment is to provide a support structure for vehicle that ensures necessary strength and satisfies fracture strength at which the support structure for vehicle is broken when an inadvertent force is applied from the outside.

A support structure for vehicle according to the present embodiment includes a body portion attached to a wheel support, a damper attachment portion which is positioned above the body portion and to which a damper is attached, a tie-rod attachment portion that extends from the body portion in one of front and rear directions of the vehicle and to which a tie rod is attached, a lower arm attachment portion which is positioned below the body portion and to which a lower arm is attached, a first rib connecting the damper attachment portion with the tie-rod attachment portion, a second rib connecting the tie-rod attachment portion with the lower arm attachment portion, and a third rib connecting the first rib with the second rib, in which the first rib has a first inclined portion and a first thin portion that becomes a bottom portion of the first inclined portion by being inclined such that a height of the first rib gradually decreases from the damper attachment portion toward the tie-rod attachment portion, and the third rib includes a second inclined portion and a second thin portion which is a bottom portion of the second inclined portion by being inclined such that a height of the third rib gradually decreases from the second rib toward the first rib.

The first inclined portion and the second inclined portion may be formed such that the first thin portion and the second thin portion overlap each other when viewed from a side surface side of the body portion.

A through hole for attaching a wheel speed sensor may be formed in a side surface portion of the body portion in the vicinity of the first thin portion and the second thin portion.

Advantageous Effect

According to claim 1, while ensuring rigidity, when the tie-rod attachment portion positioned on the vehicle interior side is pushed from a vehicle front side to a vehicle interior side by an impact from the outside at the time of a vehicle collision or the like, the tie-rod attachment portion is fractured so as to be bent in a direction in which the tie rod does not enter the vehicle interior, and thus it is possible to suppress an influence on the vehicle interior.

According to claim 2, since a starting point of the fracture can be controlled, the fracture strength can be efficiently satisfied.

According to claim 3, the fracture starting point can be more easily controlled by forming the through hole for attaching a wheel speed sensor in a side surface portion in the vicinity of the first thin portion and the second thin portion.

DESCRIPTION OF EMBODIMENTS

Hereinafter, an embodiment of the invention will be described in detail.

Figure 1:
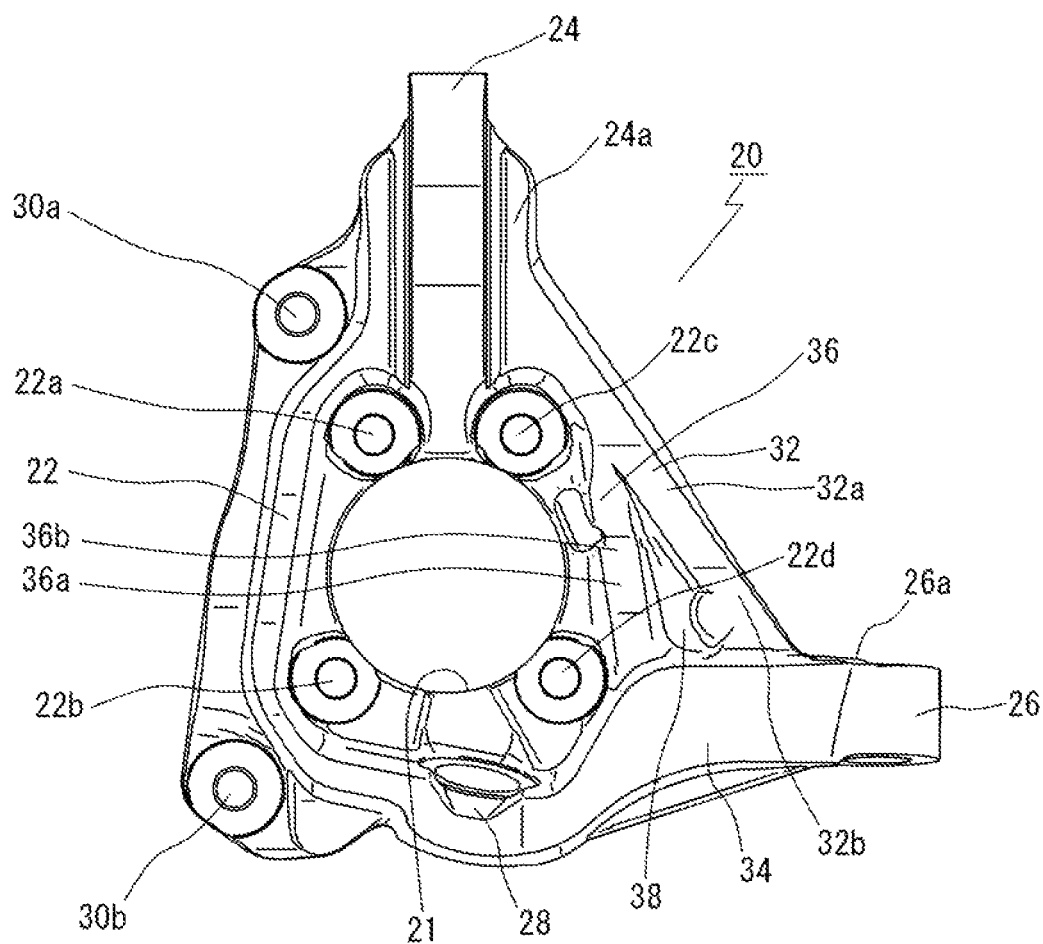
FIG. 1 is a front view of a support structure for vehicle according to the present embodiment.
Figure 2:
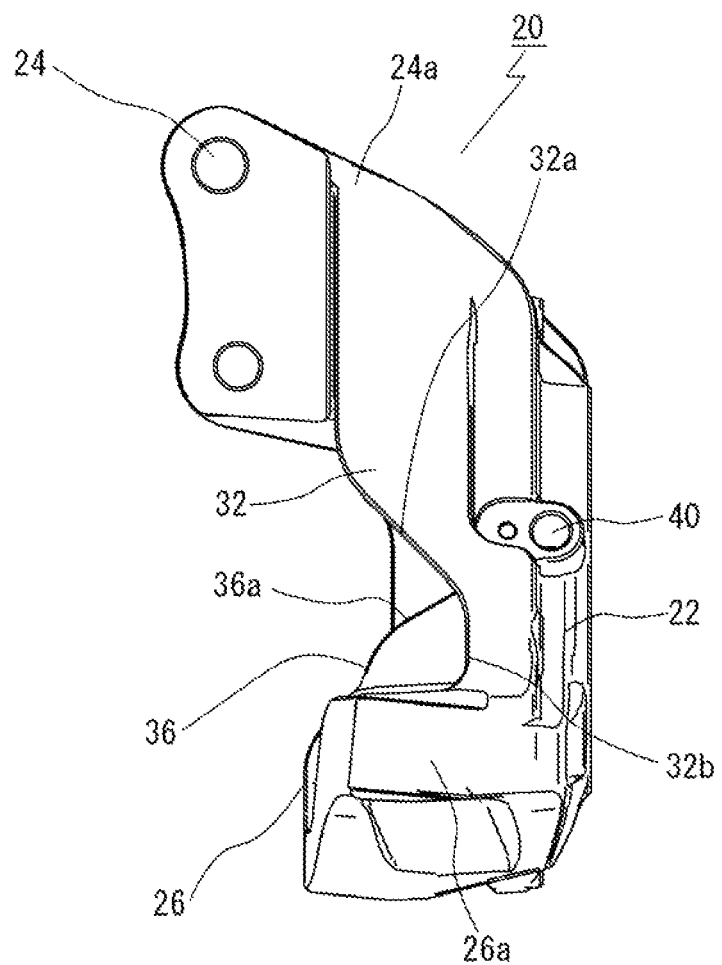
FIG. 2 is a right side view of the support structure for vehicle according to the present embodiment.
Figure 3:
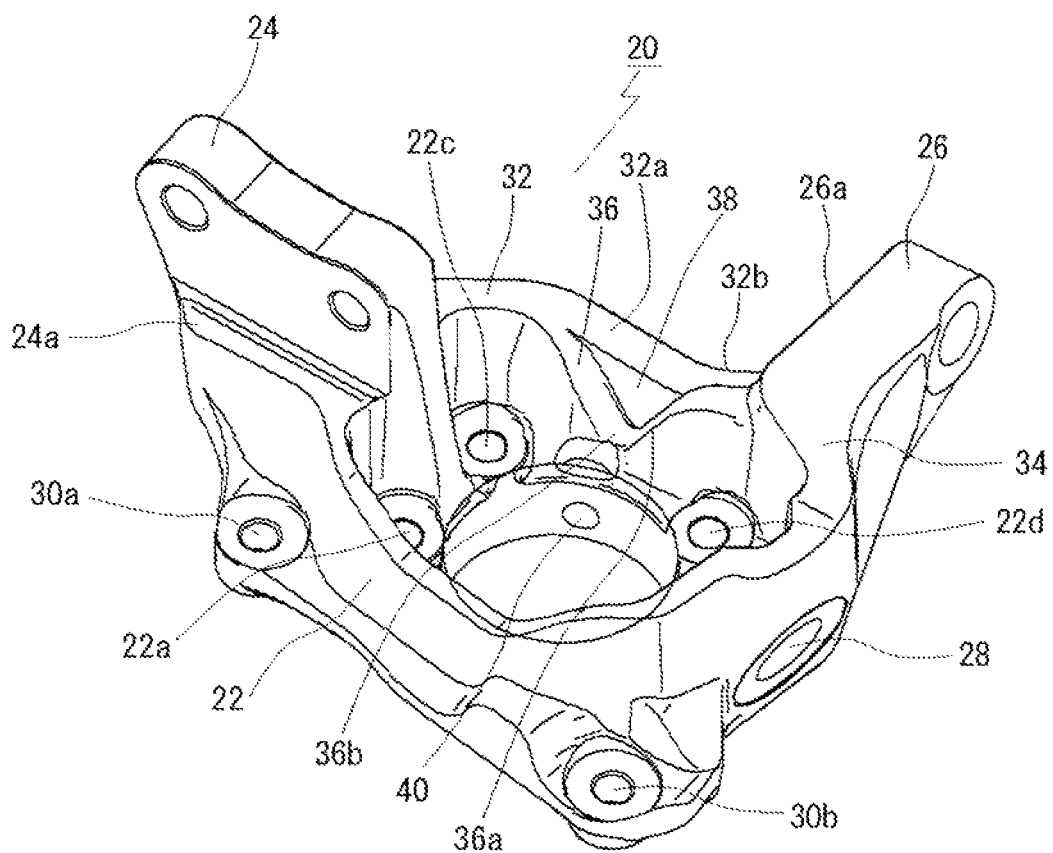
FIG. 3 is a perspective view of the support structure for vehicle according to the present embodiment.

FIG. 1 is a front view (a view seen from a vehicle side) of a support structure 20 for vehicle according to the present embodiment. FIG. 2 is a right side view of the support structure 20 for vehicle. FIG. 3 is a perspective view of the support structure 20 for vehicle.

The support structure 20 for vehicle (steering knuckle: hereinafter, simply referred to as knuckle) according to the present embodiment is made of aluminum, and is cast mainly by a gravity casting method.

FIGS. 1 to 3 show the knuckle 20 for a wheel which is a right front wheel. The knuckle for a left front wheel has a shape symmetrical to the knuckle 20 shown in FIG. 1.

Since a basic structure and function of the knuckle 20 are known, they will be briefly described below.

As shown in FIG. 3, the knuckle 20 has a recessed body portion 22 whose bottom portion is located on a wheel attachment portion side. A shaft hole 21 into which an axle of the wheel is rotatably fitted is formed in the center of the bottom surface of the recess of the body portion 22. Four bolt holes 22a, 22b, 22c, 22d to which bolts of a wheel hub (not shown) serving as a wheel support are screwed and joined are formed in a bottom portion of the body portion 22 around the shaft hole 21.

A plurality of support arms to which various members are connected extend from the body portion 22.

A damper attachment portion 24 to which a damper (not shown) of a suspension is connected is formed at a distal end portion of a support arm 24a extending to an upper portion of the body portion 22.

A tie-rod attachment portion 26 to which a tie rod (not shown) for transmitting a steering force from a steering wheel (not shown) is connected is formed at a distal end portion of a support arm 26a extending from the body portion 22 to any one of the front and rear directions of the vehicle (the rear side of the vehicle in FIG. 1).

A lower arm attachment portion 28 to which a lower arm (not shown), which is a control arm of the suspension, is connected is formed in a lower portion of the body portion 22.

Attachment holes 30a and 30b for attaching a brake caliper (not shown) are formed in a side surface portion of the body portion 22 opposite to the tie-rod attachment portion 26.

A first rib 32 connecting the damper attachment portion 24 with the tie-rod attachment portion 26 is formed between the damper attachment portion 24 and the tie-rod attachment portion 26. The first rib 32 has a required height and a required width when viewed from the bottom surface of the body portion 22.

A second rib 34 connecting the tie-rod attachment portion 26 with the lower arm attachment portion 28 is formed between the tie-rod attachment portion 26 and the lower arm attachment portion 28. The second rib 34 has a required height and a required width when viewed from the bottom surface of the body portion 22.

The second rib 34 is formed to be wider than the first rib 32.

A third rib 36 is formed between the first rib 32 and the second rib 34 so as to bridge the first rib 32 and the second rib 34. The third rib 36 constitutes a part of a wall portion of the recessed body portion 22.

A recess 38 is formed by casting in a region surrounded by the first rib 32, the second rib 34, and the third rib 36 so that these ribs have a required width.

The first rib 32, the second rib 34, and the third rib 36 having a required height and a required width form a structure having a triangular shape in a front view, and as a result, the required strength (rigidity) is ensured even in an aluminum knuckle having a strength lower than an iron knuckle.

Reference numeral 40 denotes a through hole for attaching a wheel speed sensor provided in the side surface portion of the body portion 22.

In the present embodiment, the first rib 32 is formed with a first inclined portion 32a inclined such that the height gradually decreases from the damper attachment portion 24 toward the tie-rod attachment portion 26, and a first thin portion 32b having a low height, which is a bottom portion of the first inclined portion 32a, is formed.

The third rib 36 is formed with a second inclined portion 36a inclined such that the height gradually decreases from the second rib 34 toward the first rib 32, and a second thin portion 36b serving as a bottom portion of the second inclined portion 36a.

Therefore, when viewed from a side surface side of the knuckle 20 (FIG. 2), an inclined surface of the first inclined portion 32a and an inclined surface of the second inclined portion 36a intersect each other in a substantially V-shape. The first inclined portion 32a and the second inclined portion 36a are formed such that the first thin portion 32b and the second thin portion 36b substantially overlap each other when viewed from the side surface side of the knuckle 20.

In the present embodiment, the position of the through hole 40 for attaching a wheel speed sensor provided in the side surface portion of the body portion 22 is set so as to be in the vicinity of the first thin portion 32b and the second thin portion 36b.

In this way, the first rib 32 and the third rib 36 are secured such that the ribs having a required height are relatively long by shortening the thin portions. As a result, a triangular structure is secured by the first rib 32, the second rib 34, and the third rib 36, and the strength (rigidity) required in a normal state is maintained.

On the other hand, the first thin portion 32b and the second thin portion 36b serve as starting points of bending of the first rib 32 and the third rib 36, respectively. When an external force is applied to the knuckle 20 from a front direction or an oblique front direction due to an inadvertent external force from the front direction or the oblique front direction, the first thin portion 32b and the second thin portion 36b serve as starting points of bending of the first rib 32 and the third rib 36, respectively, the first rib 32 and the third rib 36 are bent, and the knuckle 20 is bent as a whole between the damper attachment portion 24 and the tie-rod attachment portion 26. Thus, it is possible to reduce a possibility that the tie-rod attachment portion 26 enters the vehicle interior, and to suppress an influence on the vehicle interior.

By appropriately setting the length of the first inclined portion 32a, that is, the position of the first thin portion 32b, and the position of the second inclined portion 36a, that is, the position of the second thin portion 36b, a starting point of bending (fracture) can be controlled.

As described above, in the case where the position of the through hole 40 for attaching a wheel speed sensor provided in the side surface portion of the body portion 22 is set so as to be in the vicinity of the first thin portion 32b and the second thin portion 36b, since the strength of the first thin portion 32b and the second thin portion 36b is further reduced, when an inadvertent force is applied from the outside, the knuckle 20 is easily bent at the portion, and the influence on the vehicle interior can be further suppressed.

What is claimed is:

1. A support structure for vehicle, comprising:
   a body portion that is attachable to a wheel support;
   a damper attachment portion which is positioned above the body portion and to which a damper can be attached;
   a tie-rod attachment portion that extends from the body portion in one of front and rear directions of a vehicle and to which a tie rod can be attached;
   a lower arm attachment portion which is positioned below the body portion and to which a lower arm can be attached;
   a first rib connecting the damper attachment portion with the tie-rod attachment portion;
   a second rib connecting the tie-rod attachment portion with the lower arm attachment portion; and
   a third rib connecting the first rib with the second rib,
   wherein
   the first rib has a first inclined portion and a first thin portion that becomes a bottom portion of the first inclined portion by being inclined such that a height thereof gradually decreases from the damper attachment portion toward the tie-rod attachment portion, and the third rib includes a second inclined portion and a second thin portion which is a bottom portion of the second inclined portion by being inclined such that a height of the third rib gradually decreases from the second rib toward the first rib.

2. The support structure for vehicle according to claim 1, wherein the first inclined portion and the second inclined portion are formed such that the first thin portion and the second thin portion overlap each other when viewed from a side surface side of the body portion.

3. The support structure for vehicle according to claim 1, wherein a through hole for attaching a wheel speed sensor is formed in a side surface portion of the body portion in the vicinity of the first thin portion and the second thin portion.

4. The support structure for vehicle according to claim 2, wherein a through hole for attaching a wheel speed sensor is formed in a side surface portion of the body portion in the vicinity of the first thin portion and the second thin portion.

\* \* \* \* \*